United States Patent Office 3,016,330
Patented Jan. 9, 1962

3,016,330
THERAPEUTICAL ANTIBIOTIC COMPOSITION
Hans Jacobsen, Copenhagen, Denmark, assignor to Novo Terapeutisk Laboratorium A/S, Copenhagen, Denmark, a Danish joint-stock company
No Drawing. Filed Nov. 6, 1956, Ser. No. 620,573
Claims priority, application Denmark Nov. 10, 1955
10 Claims. (Cl. 167—65)

In combating infectious diseases of human beings and animals under the employment of antibiotics attempts have in different ways been made to arrive at preparations having a protracted effect. By antibiotics are to be understood all bactericidal or bacteriostatic substances which can be produced by fermentation with various fungi or bacteria in suitable nutritive substrates.

The antibiotics most frequently used are employed in the form of their salts most of which are easily soluble in water. However, as aqueous solutions of antibiotics are resorbed quickly attempts have been made to delay the resorption by suspending the water-soluble salts in a non-aqueous suspension medium in which the salts are not soluble. As non-aqueous suspension media use has especially been made of esters of higher fatty acids, preferably in the form of vegetable oils.

Even after the appearance of salts of antibiotics being slightly soluble in water and which in aqueous suspension show a delayed resorption it has been tried to further increase the protracted degree by suspending these salts in non-aqueous suspension media, preferably vegetable oils.

An essential increase of the protracted degree of practical clinical importance was, however, not obtained until as suspension medium instead of oil use was made of the thixotropic gels which can be produced by heating a mixture of an oil and a metal salt of a fatty acid, preferably an aluminum salt.

In order to illustrate what is said above the circumstances in connection with the most utilized antibiotic, i.e. penicillin, shall be briefly explained in the following. This antibiotic was for the first time used in the form of an aqueous solution of one of the alkali metal salts, preferably the sodium salt. After intermuscular injection an aqueous solution of sodium penicillin has a therapeutical action for about 4 to 6 hours. By therapeutical action is to be understood the space of time during which measurable concentrations of the antibiotic in question can be detected in the blood. When sodium penicillin is suspended in a mixture of a vegetable oil and bees' wax a therapeutical action up to 24 hours may be obtained after injection with such suspension.

The first penicillin salt being slightly soluble in water and produced and used in the therapy was procaine penicillin which, when suspended in water and injected, may give a protracted effect exceeding 24 hours. A corresponding protracted degree can be obtained when employing suspensions in oil of procaine penicillin. If, on the other hand, procaine penicillin is suspended in a thixotropic gel produced by heating a mixture of an injectable oil and an aluminum stearate, it will be possible to arrive at a therapeutical action for a period of time of 96 hours.

As suspensions of antibiotics in thixotropic gels of the above mentioned type are stable even under unfavourable storing conditions, e.g. elevated day temperatures, and as with such suspensions it is possible to obtain a strongly protracted effect, the employment of these gels involved a considerable progress under such circumstances where the storing conditions are unfavourable, for instance in tropical or sub-tropical countries, and where the practical conditions render difficult frequent injections of the patients.

The employment of the said gels has not been limited to injectable preparations in connection with procaine penicillin, but has been extended to preparations for other use in connection with other penicillin salts and other antibiotics. Thus, mastitis preparations have for instance been produced on the basis of sodium penicillin or salts of streptomycin or dihydrostreptomycin, if desired together with procaine penicillin, suspended in a gel of aluminum stearate and paraffin oil or other mineral oils.

Up to now it has not been possible with certainty to explain the reason for the special effect of the said gels, but the supposition has been advanced that the gel has a network structure in which aluminum or aluminum soap molecules are placed in different corners of cubes or other tridimentional bodies formed by the oil molecules, and that the network structure regulates the release of the antibiotic from the gel. At any rate the opinion has been that formatiion of the gel was an imperative condition for the appearance of the specific pronounced protracted effect.

The present invention, which relates to therapeutical antibiotic compositions or preparations with protracted effect for combating infectious diseases, is based on the surprising observation that the strongly protracted effect aimed at may be obtained without the formation of a gel of the oil and the aluminum salt of the fatty acid when the particles of the antibiotic in question are coated with the aluminum salt of the fatty acid before being suspended in the oil.

When using the above mentioned coating it is possible not only to arrive at preparations with the same protracted effect as that of the known preparations, in the production of which use is made of the said thixotropic gels, but also to obtain a series of advantages besides the technical advantage consisting in that the production of a gel is made superfluous.

In order to be injectable, preparations or compositions of the mentioned kind should be so thin-flowing that under practical conditions they can easily be sucked up through the needle of an injection syringe and can easily be extruded therefrom. The gels in question are, however, rather viscous and even if they become less viscous by suspending therein the said antibiotic, the suspension produced will be too viscous for practical use for which reason it has been necessary to make use of special measures for the purpose of decreasing the viscosity of the suspension. Such measures which may consist in a vigorous agitation for a rather long period of time (24 hours or more) at elevated temperature, will be completely superfluous in connection with the invention, according to which suspensions are immediately obtained which are in possession of the desired low viscosity, and according to which it will even be possible to arrive at suspensions having a lower viscosity than have the known suspensions. Moreover, such modifications of the viscosity of the final prepartion which may be caused by the formation of the gels, will be avoided.

The formation of the gels which takes place by heating to temperatures of 130 centigrade or more, may cause a discoloration of the oil employed. When making use of the present invention this discoloration will be avoided so that the preparations produced according to the invention will appear as milk-white suspensions.

In the production of suspensions of procaine penicillin in gels of the mentioned art it has furthermore turned out that the particle size of the used procaine penicillin has a deciding influence on the protracted degree obtained, it being so that small particles of a size up to 50µ give a considerably stronger protracted effect than do essentially greater particles, which in practice has given rise to the international rule that 65% of the particles of procaine penicillin in the suspensions in question must have a size not exceeding 5μ. In the process according to the invention preparations will be obtained, the protracted effect of which are to a considerably minor degree dependent on the particle size of the procaine penicillin, which involves a simplification of the production of the preparations. The employment of greater particles results in a lower viscosity of the final preparations, which is of great importance in practice.

From a therapeutical point of view the present invention has moreover the important advantage that one will always be sure to obtain the desired predetermined protracted effect even as far as preparations from different series of production are concerned, which in many cases has not been possible in the known processes where as suspension medium for the antibiotic in question use is made of a gel produced by heating an oil and an aluminum salt of a fatty acid, preferably aluminum stearate.

For many years penicillin preparations sold under the registered Trade Mark PAM have been on the market, which preparations consist of a suspension of procaine penicillin G in a gel produced of aluminum monostearate and an injectable oil. These PAM-preparations have been produced by different factories, but with the same pharmaceutical composition, and they should therefore present the same protracted effect. Examinations which have been carried out by World Health Organization and published in May 1953 in Technical Report Series No. 63, have, however, shown that 9 different PAM-preparations exhibited a highly different protracted effect in clinical experiments in spite of the same pharmaceutical composition of the preparations. This circumstance, which must be due to the technical production of the preparations, has also been pointed out in British Journal of Venereal Diseases 31, 162, (1955), where it is mentioned that the protracted effect of the known PAM-preparations may vary not only from one preparation to another from different factories, but also between different series of production from the same factory. This very essential disadvantage is avoided according to the invention where it is possible with the same pharmaceutical composition of the preparations to obtain the same effect without difficulties, also for preparations from different series of production.

When certain antibiotics are administered, e.g. streptomycin, undesired secondary effects may arise, for instance of toxic art, when the initial concentration in the blood of the said antibiotic exceeds a certain limit so that it will be necessary at every injection to use a certain relatively low dose. By means of the present invention where the antibiotic in question before being suspended in the oil is coated with an aluminum salt of a fatty acid, and as a consequence thereof will be relatively slowly released after the injection, use may be made of antibiotics in greater single doses than hitherto for injection purposes.

When injecting procaine penicillin suspended in the above mentioned gels a relatively low penicillin concentration in the blood will be obtained immediately after the injection. This is disadvantageous in such cases where the nature of the disease requires an elevated initial concentration in the blood of the penicillin for combating an acute state of disease. It will, however, not be possible to obtain the desired initial effect by adding to the gel a penicillin salt which is easily soluble in water and therefore normally will be quickly resorbed. The aluminum salt of the fatty acid in the gel, ordinarily aluminum monostearate, will protect not only the procaine penicillin against a quick absorption by the fluids of the body, but also any other penicillin compound or any other antibiotic added, which are normally easily and quickly resorbed.

The situation is quite different when use is made of the present invention where it is possible to obtain the desired initial effect by suspending in the oil an antibiotic which has not beforehand been coated with an aluminum salt of a fatty acid and which is easily resorbed, and, as a consequence thereof, will have a normal course of action.

It is, therefore, a further characteristic feature of the invention that in order to obtain an elevated initial effect of the preparation, an antibiotic the particles of which have not been coated with an aluminum salt of a fatty acid, is also suspended in the oil.

As to the way in practice to carry out the process according to the invention it should be mentioned that it is known to coat particles of antibiotics with various substances in order to arrive at modified physical properties of the particles. Thus, it is known to coat crystalline particles of various penicillin compounds with capillary-active substances in order to facilitate dispersion of the crystalline particles in aqueous media. It is also known to coat crystalline particles of a penicillin salt with pectin in order to modify the physical properties of the crystalline particles.

The coating of the particles of the selected antibiotic with an aluminum salt of a fatty acid may, according to the invention, be carried out by mixing the particles of the antibiotic in question with a solution of an aluminum salt of a fatty acid in an organic solvent in which the antibiotic is practically insoluble, whereafter the solvent is evaporated. As solvent for the aluminum salt of the fatty acid may be used benzene, benzine, chloroform, trichloroethylene, carbon tetrachloride, carbon disulphide and other organic solvents in which the antibiotic employed is slightly soluble or practically insoluble. When using this coating method it has turned out that the coated antibiotic is inclined to form lumps which, however, may easily be disintegrated in a manner known per se.

In order to secure a complete homogeneity of the produced suspension, especially as regards the size of the suspended coated particles a homogenization of the produced suspension may according to the invention be undertaken in a manner known per se, by conducting the suspension through a homogenizer.

It is also possible to carry out the coating by producing a solution of the said antibiotic and an aluminum salt of a fatty acid, whereafter a precepitating agent for both the antibiotic and the aluminum salt of the fatty acid is added and the precipitate is separated and, if desired, subjected to drying.

When the preparations according to the invention are to be used for injection any oil which is utilizable for pharmaceutical purposes and which is an ester of a fatty acid with at least 12 carbon atoms, may be employed. Preferred oils are vegetable oils, such as olive oil, sesame oil, peanut oil, soya seed oil, cotton seed oil and corn oil, or mixtures thereof. Among other esters may for instance be mentioned ethyl oleate.

If the preparations according to the invention are to be used for external use or other purposes where injection is out of question, for instance in the treatment of wounds of human beings and animals (combating of mastitis), a mineral oil, such as paraffin oil and petroleum jelly, may be used, and the produced preparations may appear in the form of ointments, preferably water-free ointments.

The quantity of aluminum salt of the fatty acid to be used in coating the employed antibiotic depends on the desired protracted degree of the final preparation, as the protracted degree to a certain degree depends on the employed quantity of aluminum salt. Thus, in connection with procaine penicillin a pronounced increase of the protracted degree will be obtained when the used amount of the aluminum salt of the fatty acid is increased from about 1% to about 2.5% by the weight of the procaine penicillin, and a considerable increase of the protracted degree is obtained when the amount is increased from about 2.5% to about 5% by the weight of the procaine penicillin. As the last mentioned quantity will give a satisfactory protracted effect in practice in most cases, this quantity will be the preferred one, even if nothing prevents from using double or three times the amount. Besides, it is possible in the process according to the invention in order to obtain the same proctracted degree to use less quantities of the aluminum salt of the fatty acid than in the process according to which as suspension medium for the procaine penicillin a gel is used which has been produced by heating a mixture of an oil and the aluminum salt of the fatty acid. This is advantageous in case of preparations for injection where it is desired to introduce into the organism as small quantities of the aluminum salt as possible.

The above figures regarding the amounts of the aluminum salt of the fatty acid apply to compositions for administration on human beings. When the compositions are to be used for veterinary purposes, such as for combating mastitis, considerably higher quantities of the aluminum salt may be preferred. In an antibiotic composition according to the invention for combating mastitis and comprising a suspension in an oil of a penicillin salt and a streptomycin salt both salts being coated with an aluminum salt of a higher fatty acid, such as aluminum mono stearate, it is preferred to use the aluminum salt in amounts within the range of 20–100% by the weight of both of the antibiotic substances.

As aluminum salt of the fatty acid there may be used any salt of aluminum and a fatty acid i.e., a fatty acid containing at least 12 carbon atoms. Although use may be made of unsaturated fatty acids saturated acids are, however, preferred, and among these should be mentioned particularly lauric, palmitic and stearic acids. Both mono-, di- and trisalts of the fatty acids are applicable, but it is preferred to use the mono-salts. It is not necessary to use pure salts. Mixtures thereof, such as those which are on the market, may be used. The most preferred aluminum salt of a fatty acid is aluminum monostearate in the form of the common article of commerce containing besides aluminum monostearate also aluminum monopalmitate.

The process according to the invention can find general use in the production of antibiotic compositions with protracted effect, i.e., bactericidal or bacteriostatic substances which may be produced by fermentation with various fungi or bacteria in a suitable nutritive substrate or which after production in pure state in this way, have later-on been produced synthetically or have been subjected to a chemical conversion, such as hydrogenation, oxidation or dechlorination, in order to modify the chemical composition of the said substances. The antibiotics are preferably used in crystalline form.

The most commonly known antibiotics which may be produced by fermentation of fungi are the various penicillins produced by fermentation of the Penicillium strains, and salts and esters derived therefrom, streptomycin which is produced by fermentation of Streptomyces strains and dihydrostreptomycin and its salts derived therefrom together with antibiotics of the tetracyclin group which also may be produced by fermentation of certain strains of Streptomyces, if desired, followed by chemical conversion process. Among other antibiotics which may also be produced by fermentation of certain strains of Streptomyces may be mentioned chloromycitin, carbomycin, erytromycin, neomycin and viomycin.

Among antibiotics which may be produced by fermentation of bacteria may be mentioned bacitracin, polymyxin and tyrotricin which may be produced by fermentation of certain Bacillus strains.

Although the present invention may be used in connection with the above mentioned antibiotics, either separately or in mixture, the invention particularly aims at the production of preparations containing penicillin, streptomycin, dihydrostreptomycin or mixtures thereof. The invention has particularly as its object to use as antibiotic which is coated with an aluminum salt of a fatty acid, a penicillin salt being slightly soluble in water, preferably procaine penicillin, and/or a salt of streptomycin or dihydrostreptomycin. If it is desired at the same time to obtain an initial effect of the produced preparation, a penicillin salt being easily or slightly soluble in water may be used as antibiotic, which penicillin salt is not coated with an aluminum salt of a fatty acid.

As will be seen from what is said above, it will be possible according to the invention, to arrive at preparations exhibiting besides a pronounced protracted effect also a high initial effect. Use may here be made of antibiotics of different kinds so that the produced preparations will contain a mixture of different antibiotics.

In the following the process according to the invention will be further illustrated by means of the below examples, to which the invention is not restricted. Other antibiotic substances than those mentioned in the examples may be coated with the aluminum salts discussed in the manner disclosed in the examples or in manners equivalent thereto.

*Example 1*

16 grams of sterile aluminum monostearate is dissolved in 385 millilitres of germ-filtrated trichloroethylene by heating (to about 55 centigrades in about 10 minutes). To the solution are added 320 grams of sterile procaine penicillin containing 1000 units per milligram and being previously ground so that at least 65% of the particles have a size of $5\mu$ or less, whereafter the mixture is agitated. The trichloroethylene is removed by evaporation in vacuo whereupon the power is disintegrated in a sterile disintegrator.

315 grams of this powder are stirred in so much sterile and water-free sesame oil that the suspension will get a volume of 1000 millilitres, whereafter the suspension is homogenized and then treated in vacuo at a pressure of 1 millimeter Hg and at 30–40 centigrades for three hours in order to remove bubbles and humidity, if any.

The suspension thus obtained contains 300,000 units of penicillin per millilitre.

*Example 2*

220 grams of sterile and ground procaine penicillin containing 1000 units per milligram are dispersed in a sterile solution of 11 grams of aluminum monostearate in 265 millilitres of trichloroethylene. After evaporation of the trichloroethylene and disintegration 210 grams of the powder and 60.6 grams of sterile sodium penicillin containing 1650 units per milligram are suspended in so much sterile peanut oil that a volume of 1000 millilitres is obtained. The suspension is homogenized and evacuated as in Example 1. The suspension contains 300,000 units of penicillin per millilitre of the suspension, of which the two thirds are procaine penicillin coated with 5% of aluminum monostearate and one third is sodium penicillin without coating.

*Example 3*

340 grams of sterile and ground dihydrostreptomycin sulphate containing 780 milligrams of base per gram are dispersed in a sterile solution of 17 grams of aluminum monostearate in 550 millilitres of benzene produced by heating at about 50 centigrades for about 10 minutes. After evaporation of the benzene and disintegration 336.5 grams of the powder are stirred in sterile sesame oil until the suspension fills 1000 millilitres. The suspension is homogenized and evacuated as in Example 1. The preparation contains 250 milligrams of dihydrostreptomycin, calculated as base, per millilitre.

Having thus fully described my invention I claim as new and desire to secure by Letters Patent:

1. A non-oral antibiotic composition comprising, in combination, a pharmaceutical oil, and pre-coated particles of at least one antibiotic substance in suspension in said oil, said particles being pre-coated with an aluminum salt of a higher fatty acid with at least 12 carbon atoms, said composition exhibiting a protracted therapeutic effect.

2. A non-oral antibiotic composition as defined in claim 1, wherein the particles are coated with the aluminum salt in the amount of at least 1% by the weight of the antibiotic substance.

3. An injectable antibiotic composition comprising, in combination, an injectable pharmaceutical oil, and pre-coated particles of a penicillin compound in suspension in said oil, said particles being pre-coated with an aluminum salt of a higher fatty acid with at least 12 carbon atoms, said composition exhibiting a protracted therapeutic effect.

4. An injectable composition as defined in claim 3, wherein the penicillin compound is procaine penicillin.

5. An injectable antibiotic composition as defined in claim 3, wherein the penicillin compound is procaine penicillin and the aluminum salt is an aluminum stearate.

6. A veterinary antibiotic composition comprising, in combination, a pharmaceutical oil, and pre-coated particles of at least one antibiotic substance selected from the group consisting of penicillin, streptomycin and dihydrostreptomycin, said particles being pre-coated with an aluminum salt of a higher fatty acid with at least 12 carbon atoms.

7. A veterinary antibiotic composition as defined in claim 6, wherein the particles are pre-coated with the aluminum salt in the amount of at least 20% by weight of the antibiotic substance.

8. An injectable antibiotic composition comprising, in combination, an injectable pharmaceutical oil, and pre-coated particles of a penicillin compound in suspension in said oil, said particles being pre-coated with an aluminum salt of a higher fatty acid with at least 12 carbon atoms in the amount of at least 1% by weight of the penicillin compound, said composition exhibiting a protracted thereapeutic effect.

9. An injectable composition as defined in claim 8, wherein the penicillin compound is procaine penicillin.

10. An injectable antibiotic composition as defined in claim 8, wherein the penicillin compound is procaine penicillin and the aluminum salt is an aluminum stearate.

References Cited in the file of this patent

UNITED STATES PATENTS

| | | |
|---|---|---|
| 2,449,039 | Libby | Sept. 7, 1948 |
| 2,481,804 | Whittingham | Sept. 13, 1949 |
| 2,487,336 | Hinds | Nov. 8, 1949 |
| 2,661,315 | Jurist et al. | Dec. 1, 1953 |
| 2,733,184 | Ziegler | Jan. 31, 1956 |
| 2,734,844 | Ziegler | Feb. 14, 1956 |
| 2,738,303 | Blythe | Mar. 13, 1956 |
| 2,928,769 | Gaunt | Mar. 15, 1960 |

OTHER REFERENCES

Floyd: J. Pharmacy and Pharmacology, November 1949, pp. 747–756, esp. p. 754.